US012140050B2

(12) United States Patent
MacDonald et al.

(10) Patent No.: US 12,140,050 B2
(45) Date of Patent: Nov. 12, 2024

(54) RECUPERATED ENGINE WITH SUPERCRITICAL CO2 BOTTOMING CYCLE

(71) Applicant: RAYTHEON TECHNOLOGIES CORPORATION, Farmington, CT (US)

(72) Inventors: Malcolm P. MacDonald, Bloomfield, CT (US); Stephen H. Taylor, East Hartford, CT (US); Ram Ranjan, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/109,448

(22) Filed: Feb. 14, 2023

(65) Prior Publication Data

US 2023/0313711 A1 Oct. 5, 2023

Related U.S. Application Data

(60) Provisional application No. 63/324,817, filed on Mar. 29, 2022.

(51) Int. Cl.
*F01K 23/10* (2006.01)
*F01K 25/10* (2006.01)

(52) U.S. Cl.
CPC ............ *F01K 23/10* (2013.01); *F01K 25/103* (2013.01); *F05D 2220/76* (2013.01); *F05D 2260/211* (2013.01); *F05D 2260/213* (2013.01)

(58) Field of Classification Search
CPC ...... F02C 7/08; F02C 7/10; F02C 7/32; F02C 7/36; F02C 1/06; F02C 6/18; F02C 7/141; F02C 7/143
See application file for complete search history.

(56) References Cited

U.S. PATENT DOCUMENTS

| | | | |
|---|---|---|---|
| 9,562,471 B1 * | 2/2017 | Pasch | F01D 17/00 |
| 10,309,262 B2 | 6/2019 | Bak et al. | |
| 10,731,515 B2 | 8/2020 | Cha | |
| 11,047,265 B1 | 6/2021 | Prabhudharwadkar et al. | |
| 11,098,615 B2 | 8/2021 | Huang et al. | |
| 11,143,104 B2 * | 10/2021 | Pal | F02C 9/00 |
| 11,187,148 B1 | 11/2021 | MacDonald et al. | |
| 11,225,905 B1 | 1/2022 | Holley et al. | |
| 11,230,948 B2 | 1/2022 | McAuliffe et al. | |

(Continued)

OTHER PUBLICATIONS

European Search Report for European Application No. 23153739.0 mailed Jun. 30, 2023.

*Primary Examiner* — Thuyhang N Nguyen
(74) *Attorney, Agent, or Firm* — Carlson, Gaskey & Olds, P.C.

(57) ABSTRACT

A gas turbine engine includes a core engine that includes a core flow path that connects a compressor section, combustor section and a turbine section. The gas turbine engine further includes a bottoming cycle system that includes a supercritical CO2 (sCO2) working fluid flow. A first recuperator is disposed in the core flow path downstream of the turbine section, the first recuperator is configured to transfer thermal energy from a core flow aft of the turbine section to the sCO2 working fluid flow. A second recuperator is disposed in the compressor section, the second recuperator is configured to transfer thermal energy from the sCO2 working fluid flow to a location forward of the combustor section.

11 Claims, 6 Drawing Sheets

(56) References Cited

U.S. PATENT DOCUMENTS

| | | | |
|---|---|---|---|
| 2012/0000204 A1* | 1/2012 | Kesseli | F02C 3/107 |
| | | | 60/778 |
| 2013/0104563 A1* | 5/2013 | Oelfke | F02C 3/02 |
| | | | 60/773 |
| 2017/0356340 A1* | 12/2017 | Vaisman | F02C 1/10 |
| 2019/0063319 A1* | 2/2019 | Forrest | F02C 1/06 |
| 2019/0249599 A1* | 8/2019 | Sen | F02C 3/04 |
| 2020/0224588 A1 | 7/2020 | Somanath et al. | |

* cited by examiner

RECUPERATED ENGINE WITH SUPERCRITICAL CO2 BOTTOMING CYCLE

CROSS-REFERENCE TO RELATED APPLICATION

The present disclosure claims priority to U.S. Provisional Application No. 63/324,817 filed Mar. 29, 2022.

STATEMENT REGARDING FEDERALLY SPONSORED RESEARCH OR DEVELOPMENT

This subject of this disclosure was made with government support under Contract No.: DE-AR0001342 awarded by the United St Department of Energy. The government therefore may have certain rights in the disclosed subject matter.

TECHNICAL FIELD

The present disclosure relates generally to a system for recovering waste heat in a gas turbine engine, and more specifically to a work recovery system utilizing a supercritical CO2 cycle to recover work from excess heat.

BACKGROUND

A gas turbine engine typically mixes a carbon based fuel with air within a combustor where it is ignited to generate a high-energy exhaust gas flow. Improving engine operating efficiencies are driven by economic and environmental demands. Most engine inefficiencies are due to heat lost when the high-energy exhaust gas flow exits the turbine and vents to atmosphere. Capture of waste heat may increase overall engine operating efficiencies.

Turbine engine manufacturers continue to seek further improvements to engine performance including improvements to thermal, transfer and propulsive efficiencies.

SUMMARY

A gas turbine engine according to an exemplary embodiment of this disclosure, among other possible things includes a core engine that includes a core flow path that connects a compressor section, combustor section and a turbine section. The gas turbine engine further includes a bottoming cycle system that includes a supercritical CO2 (sCO2) working fluid flow. A first recuperator is disposed in the core flow path downstream of the turbine section, the first recuperator is configured to transfer thermal energy from a core flow aft of the turbine section to the sCO2 working fluid flow. A second recuperator is disposed in the compressor section, the second recuperator is configured to transfer thermal energy from the sCO2 working fluid flow to a location forward of the combustor section.

In a further embodiment of the foregoing, the bottoming cycle system includes a bottoming compressor that is coupled to a bottoming turbine. Heated sCO2 working fluid flow is exhausted from the first recuperator drives the bottoming turbine.

In a further embodiment of any of the foregoing, the sCO2 working fluid flow is exhausted from the bottoming turbine and is communicated to an inlet of the second recuperator.

In a further embodiment of any of the foregoing, the bottoming compressor receives sCO2 working fluid flow that is exhausted from the second recuperator and exhausts sCO2 working fluid flow to an inlet of the first recuperator.

In a further embodiment of any of the foregoing, the gas turbine engine includes a bottoming electric machine that is coupled to at least one of the bottoming compressor and the bottoming turbine.

In a further embodiment of any of the foregoing, the electric machine includes a motor/generator driven by the bottoming turbine.

In a further embodiment of any of the foregoing, a heated sCO2 working fluid flow from the first recuperator is communicated to the second recuperator.

In a further embodiment of any of the foregoing, the gas turbine engine further includes an exhaust heat exchanger that is configured to transfer thermal energy into a sCO2 working fluid flow and exhaust the heated sCO2 working fluid flow to a bottoming turbine.

In a further embodiment of any of the foregoing, the bottom cycle system includes a bottoming compressor that is coupled to the bottoming turbine and a bottoming recuperator. The sCO2 working fluid flow exhausted from the bottoming turbine is communicated to the bottoming recuperator.

In a further embodiment of any of the foregoing, the first sCO2 working fluid flow is heated by the core flow aft of the turbine and is communicated to the bottoming turbine. The sCO2 working fluid flow expands through the bottoming turbine and is exhausted to the bottoming recuperator and placed in thermal transfer contact with a cooler sCO2 working fluid flow from the bottoming compressor that is then exhausted to the first recuperator where the sCO2 working fluid flow is heated and communicated to the second recuperator to transfer thermal energy into the core flow forward of the combustor section then back through the exhaust heat exchanger to the bottoming turbine.

In a further embodiment of any of the foregoing, the sCO2 working fluid flow from the bottoming recuperator is communicated through a cool air heat exchanger where the sCO2 working fluid flow is cooled and communicated through the bottoming compressor back to the bottoming recuperator.

In a further embodiment of any of the foregoing, the gas turbine engine further includes a motor/generator coupled to the bottoming turbine.

In a further embodiment of any of the foregoing, a hot flow of sCO2 fluid flow is placed in thermal communication with a cooler flow of sCO2 working fluid within the bottoming recuperator.

In a further embodiment of any of the foregoing, the second recuperator communicates thermal energy from the sCO2 working fluid into at least one of a fuel flow or a core air flow.

In a further embodiment of any of the foregoing, the bottoming cycle system includes a bottoming compressor that is coupled to an electric motor. The electric motor drives the bottoming compressor.

A method of operating a gas turbine engine according to an exemplary embodiment of this disclosure, among other possible things includes transferring thermal energy into a super critical CO2 (sCO2) working fluid flow from an exhaust gas flow within a first recuperator. A heated sCO2 working fluid flow is communicated to a location forward of a combustor section of the gas turbine engine. Thermal energy is transferred from the sCO2 working fluid flow to a fluid flow at the location forward of the combustor section.

In a further embodiment of the foregoing, the method further includes driving a bottoming turbine by expanding the heated sCO2 working fluid through the bottoming turbine.

In a further embodiment of any of the foregoing, the method further includes generating electric power by driving a generator with the bottoming turbine.

In a further embodiment of any of the foregoing, thermal energy is transferred into a fluid flow at the location forward of the combustor and includes transferring thermal energy into one of a fuel flow or a core air flow.

In a further embodiment of any of the foregoing, the method further includes pumping the sCO2 working fluid flow with a bottoming compressor driven by the bottoming turbine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
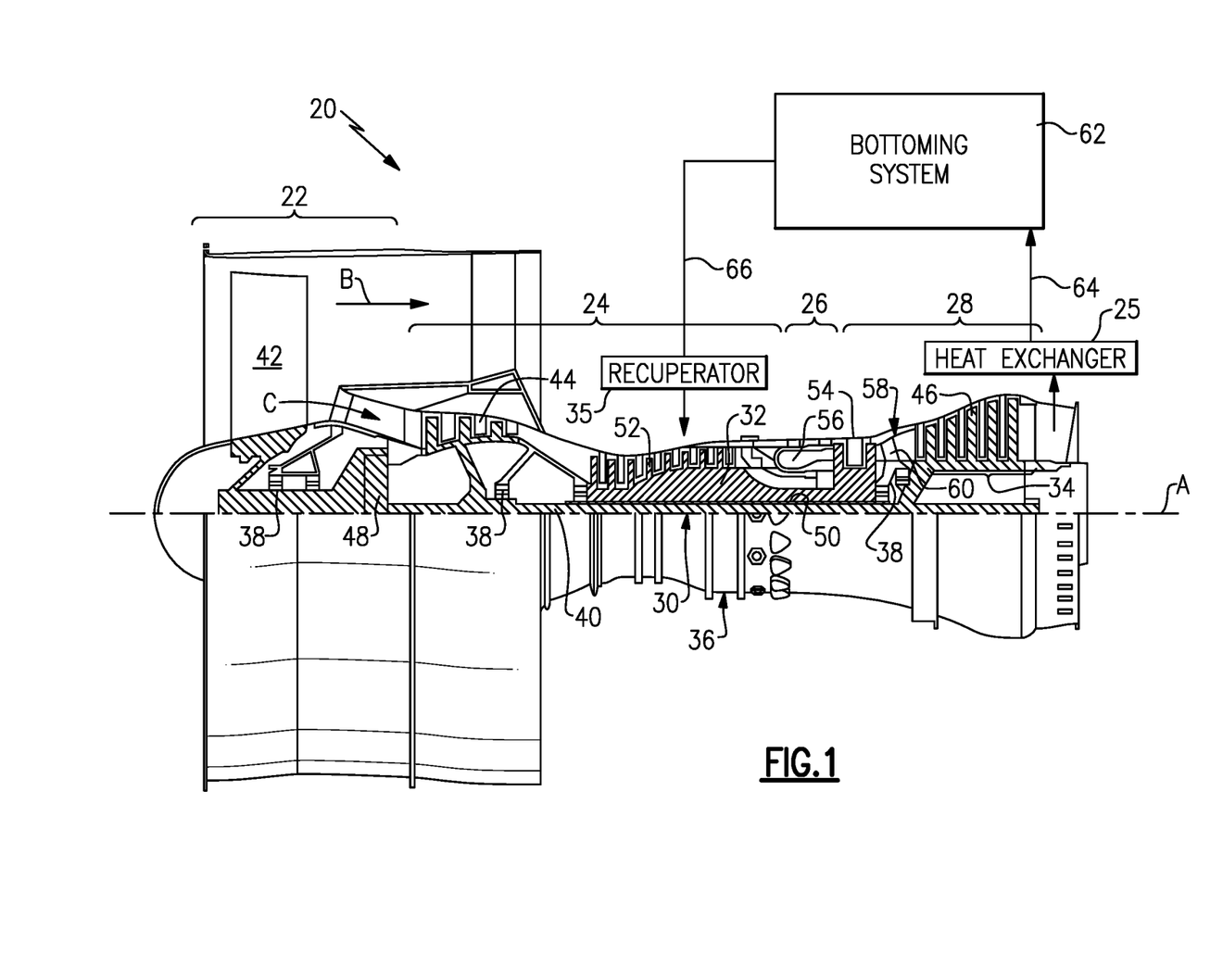
FIG. 1 schematically shows an example gas turbine engine embodiment.

FIG. 1 schematically illustrates an example gas turbine engine 20 that includes a fan section 22, a compressor section 24, a combustor section 26 and a turbine section 28. The fan section 22 drives air along a bypass flow path B, while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan section 22 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. Thermal energy produced through the combustion process is wasted as the high energy exhaust gas flow is vented to atmosphere after expansion through the turbine section 28. Increased temperatures of fuel and air prior to entering the combustor 56 can improve engine efficiency. Moreover, the thermal energy vented to atmosphere can be used to drive other systems to produce power.

A disclosed example engine embodiment includes a bottoming system 62 that transfers thermal energy, schematically indicated at 64, to colder parts of the engine as indicated at 66. The bottoming system 62 includes a working fluid that absorbs thermal energy from the exhaust gas flow in a heat exchanger 25. The working fluid is then communicated with the core air flow forward of the combustor 56 in a recuperator 35. The recapture of thermal energy from the exhaust gas flow and transfer to preheat the core airflow in a location forward of the combustor 56 provides for improved engine operating efficiencies. In one disclosed example, thermal energy from the exhaust gas flow is transferred into the core air flow in the compressor section 24 before entering the combustor 56. It should be appreciated, that the thermal energy absorbed from the exhaust gas flow may be input at other locations within in the engine 20 to improve operational engine efficiency and are within the contemplation and scope of this disclosure.

Figure 2:
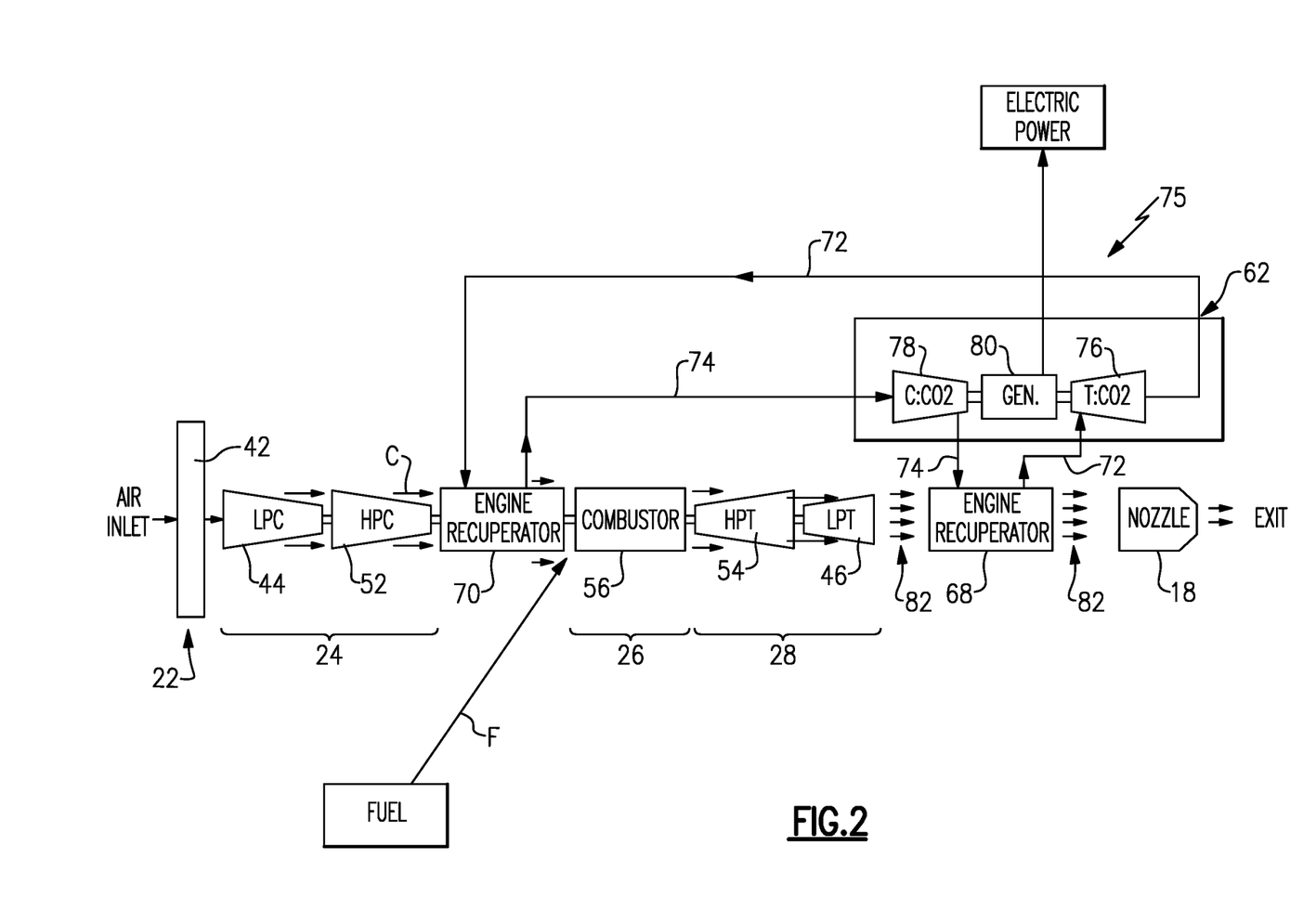
FIG. 2 schematically shows the example gas turbine engine and bottoming cycle system embodiment.

Referring to FIG. 2, another example bottoming system 62 includes a closed flow circuit of supercritical carbon dioxide (sCO2) working fluid that accepts thermal energy from an exhaust gas flow 82 and transfers the accepted thermal energy to cooler portions of the engine 20. In this disclosed example, thermal energy is transferred to a location forward of the combustor 56 and used to heat the core flow C, a fuel flow F and/or an air/fuel mixture. By heating the air and/or fuel arriving at the combustor, less fuel is required to achieve the target combustion temperature, improving engine thermal efficiency.

In the illustrated example, the working fluid is CO2, and is maintained at or above a supercritical point throughout the entirety of the working cycle. Due to being maintained at or above the supercritical point, the bottoming system 62 is referred to as a supercritical CO2 cycle (sCO2 cycle).

The example bottoming system 62 includes a bottoming turbine 76 that is coupled to a bottoming compressor 78. The bottoming turbine 76 may also be coupled to an electric machine such as a generator 80.

A first recuperator 68 is in thermal contact with the exhaust gas flow 82. In this disclosed example, the first recuperator 68 is disposed aft of the turbine section 28 and forward of exhaust nozzle 18. It should be appreciated, that the first recuperator 68 may be located anywhere within the engine 20 to provide for acceptance of thermal energy.

A second recuperator 70 is located forward of the combustor 56 for adding thermal energy back into the engine 20. In this disclosed example, the second recuperator 70 is located to heat the core flow C exiting the compressor section 24 prior to entering the combustor 56.

The first and second recuperators 68, 70 are heat exchangers that are configured to place the core airflow C in thermal contact with the flow of sCO2 working fluid flow schematically indicated at 72. The sCO2 working fluid flow is directed through a flow circuit 75 to transfer thermal energy between hot and cooler portions of the engine 20.

In this example, the flow circuit 75 directs the sCO2 working fluid flow from an initial temperature and pressure into the first recuperator 68. In the first recuperator 68, the sCO2 working fluid flow is heated by the exhaust gas flow 82. The hot sCO2 working fluid flow 72 is communicated through the bottoming turbine 76 and to the second recuperator 70. In the second recuperator 70, the hot sCO2 working fluid flow 72 heats the core flow C and is then communicated to the bottoming compressor 78.

The bottoming turbine 76 expands the sCO2 to lower pressure in order to extract power. It may expand the sCO2 below the critical pressure, which is referred to as overexpansion. The bottoming compressor 78 returns the sCO2 to the supercritical pressure state at the beginning of the cycle.

In this disclosed embodiment, the bottoming turbine 76 drives a generator 80 to produce electric power. The electric power produced by the bottoming system 62 may be utilized anywhere within the aircraft or engine 20 and reduces the amount of electric power required to be generated by the primary engine 20. Alternatively, the power produced may be used to directly assist the main engine shaft through a mechanical coupling, which may or may not include gear reduction. Alternatively, the power produced may directly drive another rotating component, such as an auxiliary propulsor for the aircraft.

Operation of the bottoming system 62 to recover and use waste heat begins with the bottoming compressor 78 compressing the working fluid, and passing the compressed working fluid flow 74 to the first recuperator 68. In the first recuperator, sCO2 working fluid flow is heated and directed to the bottoming turbine 76. In the bottoming turbine 76, the heated sCO2 working fluid flow working fluid 72 is expanded to drive rotation. The sCO2 working fluid flow exits the bottoming turbine 76 and is routed to the second recuperator 70 to transfer thermal energy into the core flow C and/or air/fuel mixture prior to entering the combustor 56.

In the bottoming turbine 76, sCO2 working fluid flow is expanded below the pressure state at the beginning of the cycle. The rotation of the bottoming turbine 76 drives rotation of the compressor 78 through a coupling therebetween. The compressor elevates the pressure to return the sCO2 working fluid flow to a supercritical point. The process continues with a constant flow sCO2 working fluid through the circuit 75.

Figure 3:
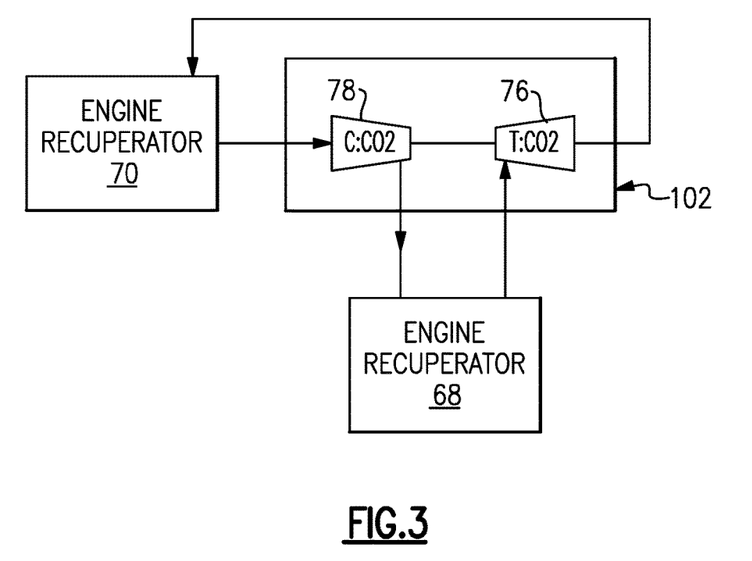
FIG. 3 schematically shows another example bottoming cycle system embodiment.

Referring to FIG. 3, another bottoming cycle system is schematically shown and indicated at 102. The bottoming cycle system 102 includes the bottoming compressor 78 driven by the bottoming turbine 76 as shown and described in the previous embodiment. The bottoming cycle system 102 has the bottoming turbine 76 driving only the bottoming turbine 78, without a generator or other driven device. Because the bottoming turbine 76 is driving only the bottoming compressor 78, the bottoming turbine 76 may be designed to operate at a more efficient operating speed than if other devices were also being driven. Another device, such as a generator operates best at one operating speed, while the bottoming compressor 76 may best operate at a different operating speed. Thereby, the speed of operation of the bottoming turbine 76 may require a compromise to drive both. However, in this disclosed embodiment, the bottoming turbine 76 may be designed and operated at a speed desired to provide efficient operation of the bottoming compressor 78.

Figure 4:
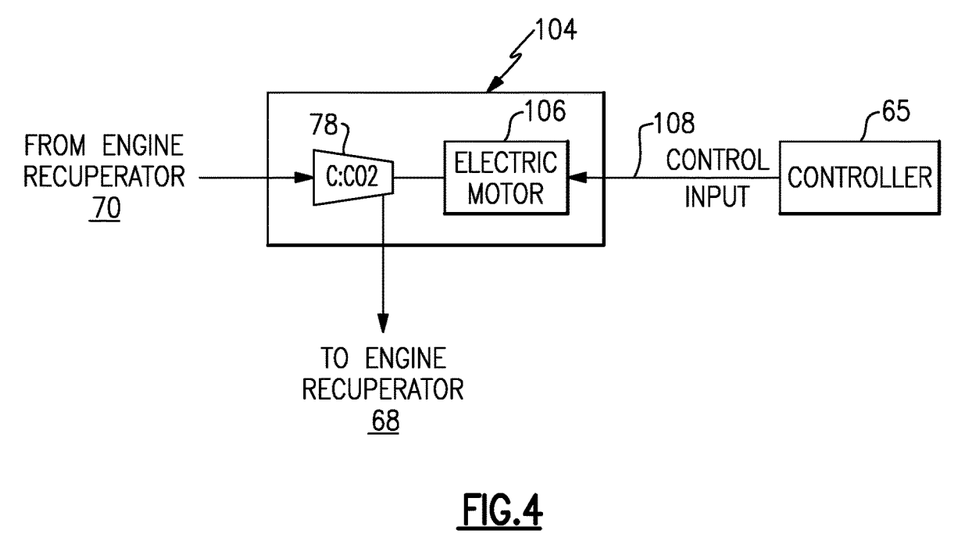
FIG. 4 schematically shows another example bottoming cycle system embodiment.

Referring to FIG. 4, another bottoming cycle system 104 is schematically indicated at 104 and includes an electric motor 106 operated to drive the bottoming compressor 78. The electric motor 106 drives the bottoming compressor 78 at a speed based on a control input 108 from a controller 65. The controller 6 and control input 108 may include instructions from an engine and/or aircraft controller. The control input 108 may be based on a measured parameter or on a predefined schedule to provide desired operation of the bottoming compressor 78.

The bottoming cycle system 104 decouples operation of the bottoming compressor 78 from a turbine to provide for operation independent of engine operation and the amount of heat accepted by the sCO2 working fluid flow. The sCO2 working fluid flow may have varying amounts of heat energy based on the heat produced by the engine. This variation in heat energy may vary operation of the turbine driving the bottoming compressor 78 in a way that differs from variations in demand that may occur during engine operation. Moreover, driving the bottoming compressor 78 with the electric motor 106 is based on a control input 108 that can be adjusted to tailor operation to specific conditions. Additionally, the electric motor 106 may be able to more quickly adapt to desired changes in operation to better accommodate changing demand and operating conditions.

Figure 5:
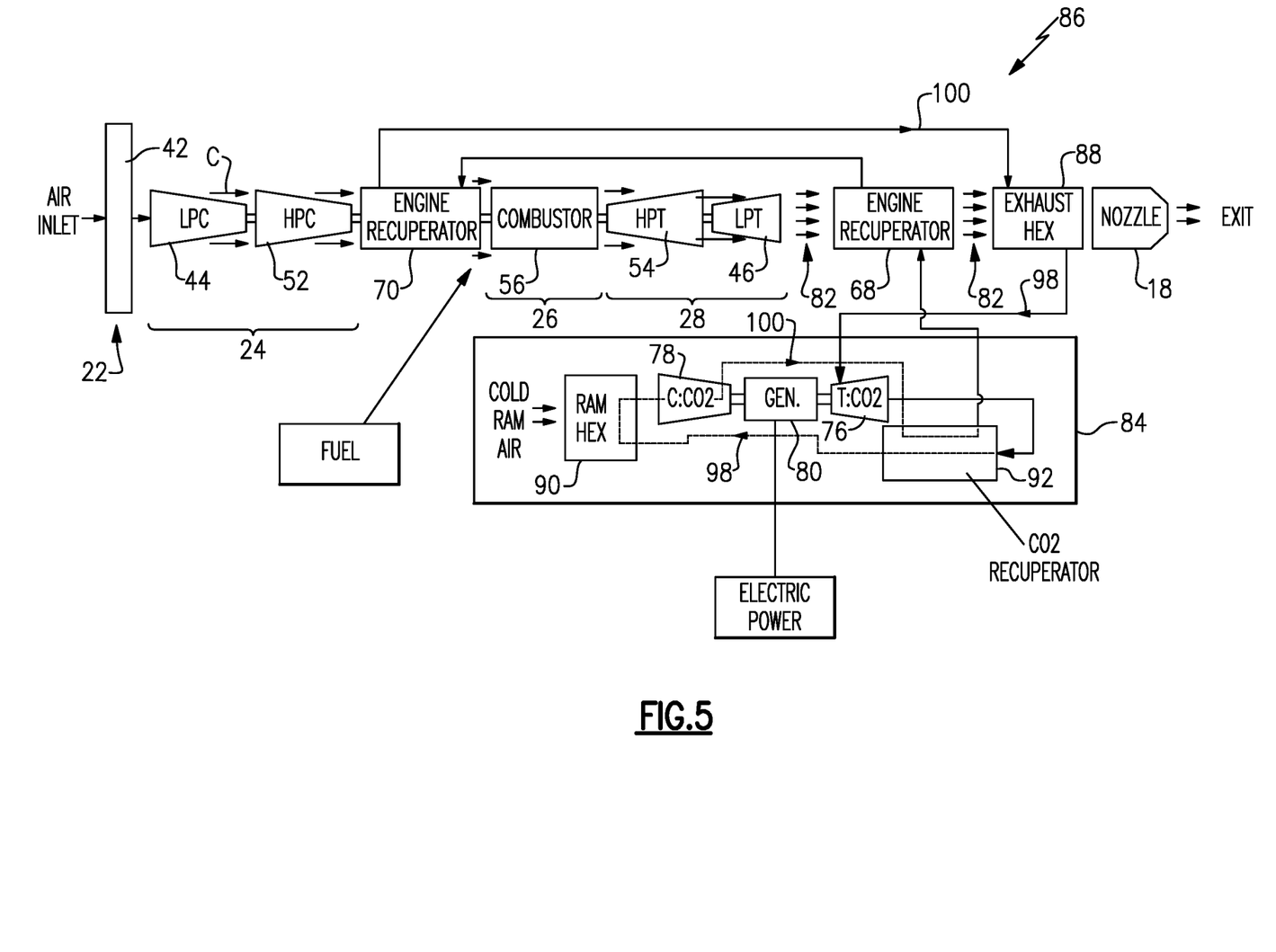
FIG. 5 schematically shows another example gas turbine engine and bottoming cycle system embodiment.

Referring to FIG. 5, another example engine assembly 86 includes a bottoming cycle 84 that is utilized to transfer heat within the engine assembly and to produce power from reclaimed heat within the exhaust gas flow.

The sCO2 working fluid flow is circulated directly from the first recuperator 68 to the second recuperator 70. In the first recuperator 68 the sCO2 working fluid flow is heated by the exhaust gases 82. The heated sCO2 working fluid is directed to the second recuperator 70 that is in thermal communication with the core engine flow and/or air/fuel mixture forward of the combustor 56. From the second recuperator, the sCO2 working fluid flow is directed to an exhaust heat exchanger 88.

In the exhaust heat exchanger 88, the sCO2 working fluid flow is again heated and communicated back to the bottoming turbine 76. Expansion of the sCO2 working fluid flow through the bottoming turbine 76 drives rotation of the turbine 76 to drive the bottoming generator 80 and bottoming compressor 78. The sCO2 working fluid flow from the bottoming turbine 76 is routed through a bottoming recuperator 92. In the bottoming recuperator 92, the hot sCO2 working fluid flow transfers heat into sCO2 working fluid flow within exhausted from an outlet of the bottoming compressor 78. The cooled sCO2 working fluid flow is then communicated back to the first recuperator 68 for heating.

The heated sCO2 working fluid flow from the bottoming recuperator 92 is directed through a ram air heat exchanger 90 for cooling and then to the bottoming compressor 78. The bottoming compressor 78 returns the sCO2 working fluid flow to the supercritical pressure and returns the flow to the bottoming recuperator 92. The bottoming turbine 76 drives the generator 80 to generate electric power. The exhaust heat exchanger 88 provides additional heat input to the bottoming system 84 to perform additional work. In this example embodiment, the additional work output is in the form of electric power produced by driving the generator. However, other energy production that can be performed from a driven turbine may be utilized and is within the contemplation and scope of this disclosure.

Figure 6:
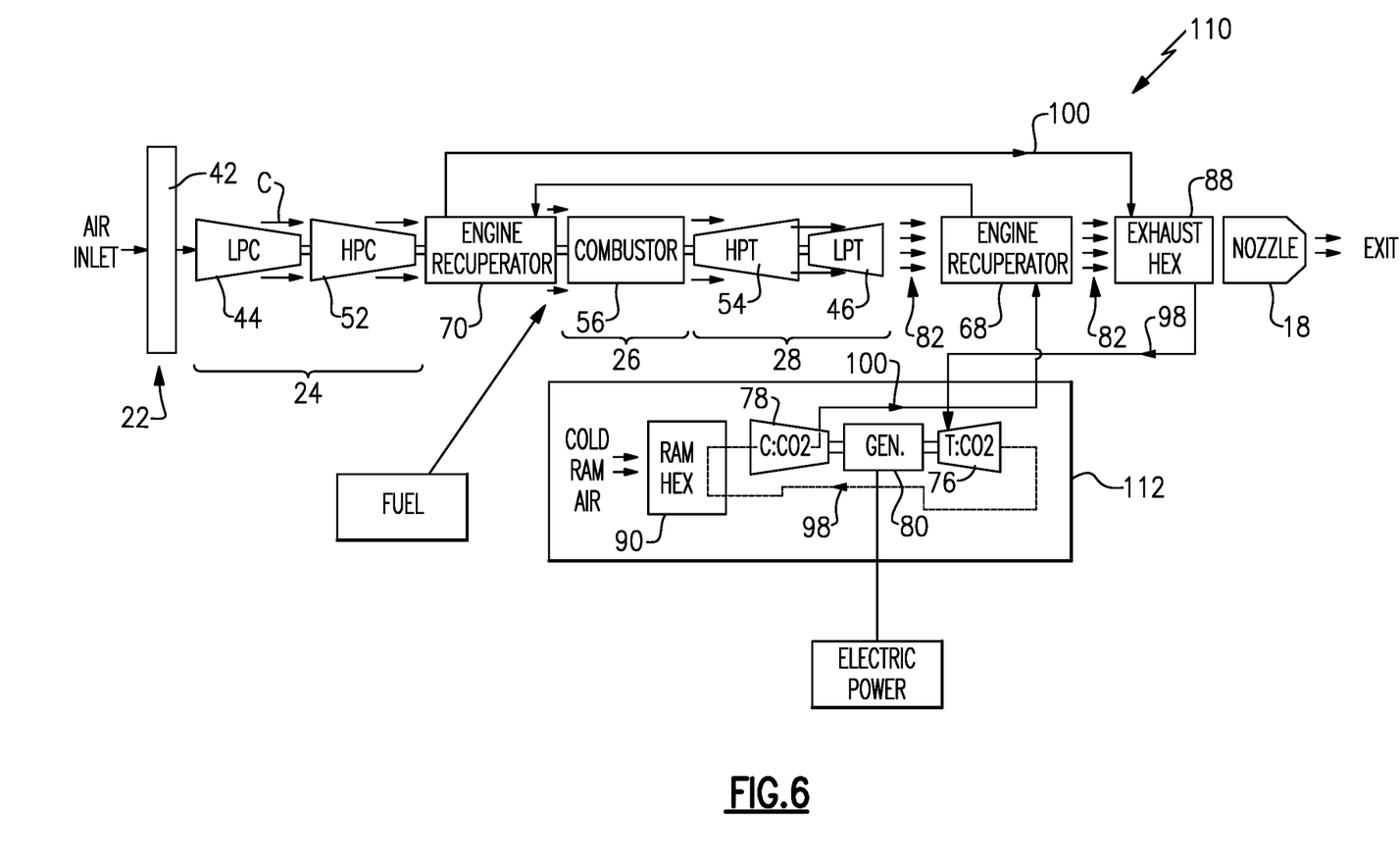
FIG. 6 schematically shows another example gas turbine engine and bottoming cycle system embodiment.

Referring to FIG. 6, another example engine assembly 110 includes a bottoming cycle system 112 that does not include a bottoming recuperator 92. In this disclosed embodiment, sCO2 working fluid flow is exhausted from the bottoming turbine 76 through the ram air heat exchanger 90 to the bottoming compressor 78. In this example, heat is not transferred between sCO2 working fluid flows of different temperatures, but is instead fed to the respective heat exchangers in the engine 110. Removing the bottoming recuperator 92 is another configuration that provides for tailoring of the bottoming system 112 to application specific operating conditions.

Figure 7:
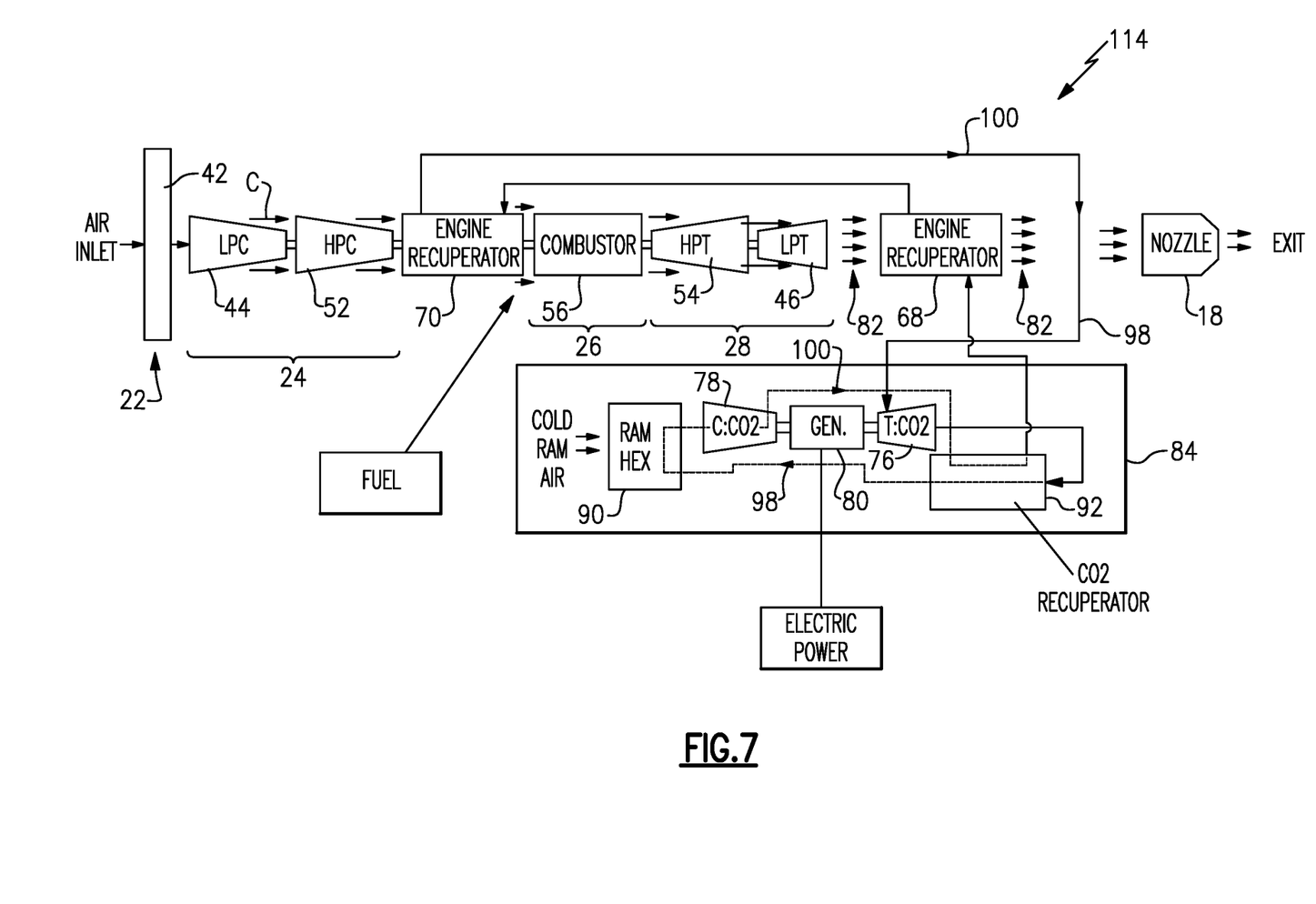
FIG. 7 schematically shows another example gas turbine engine and bottoming cycle system embodiment.

Referring to FIG. 7, another example engine assembly 114 with the bottoming cycle 84 operates without the exhaust heat exchanger 88 shown in FIG. 6. The first engine recuperator 68 provides the thermal and energy transfer desired to operate the bottoming cycle system 84. The sCO2 working fluid flow 100 that is exhausted from the engine recuperator 70 provides the thermal transfer required to provide the desired amount of power output. Additional heating of the sCO2 working fluid may not always be needed and the example system 114 illustrates how the example bottoming system 84 maybe incorporated with different heat exchangers and recuperators to provide the desired amount of energy reclamation.

Accordingly, the disclosed example bottoming systems provide for recovery of heat that would otherwise be unused to improve overall engine efficiency and operation.

While described above in conjunction with a geared turbofan engine, it is appreciated that the waste heat recovery system described herein can be utilized in conjunction with any other type of turbine engine with only minor modifications that are achievable by one of skill in the art.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a core engine including a core flow path connecting a compressor section, combustor section and a turbine section, wherein the compressor section generates a compressed core flow from an inlet airflow that is mixed with fuel in the combustor and ignited to generate an exhaust gas flow;
   a bottoming cycle system including a supercritical CO2 (sCO2) working fluid flow circulating through a bottoming compressor coupled to a bottoming turbine;
   a first recuperator disposed in the core flow path downstream of the turbine section, the first recuperator configured to transfer thermal energy from the exhaust gas flow aft of the turbine section to the sCO2 working fluid flow; and
   a second recuperator disposed in the compressor section, the second recuperator configured to transfer thermal energy from the sCO2 working fluid flow into the compressed core flow at a location forward of the combustor section.

2. The gas turbine engine as recited in claim 1, wherein heated sCO2 working fluid flow exhausted from the first recuperator drives the bottoming turbine.

3. The gas turbine engine as recited in claim 2, wherein the sCO2 working fluid flow exhausted from the bottoming turbine is communicated to an inlet of the second recuperator.

4. The gas turbine engine as recited in claim 3, wherein the bottoming compressor receives sCO2 working fluid flow exhausted from the second recuperator and exhausts sCO2 working fluid flow to an inlet of the first recuperator.

5. The gas turbine engine as recited in claim 2, including a bottoming electric machine coupled to at least one of the bottoming compressor and the bottoming turbine.

6. The gas turbine engine as recited in claim 5, wherein the electric machine comprises a motor/generator driven by the bottoming turbine.

7. A method of operating a gas turbine engine comprising:
   transferring thermal energy into a super critical CO2 (sCO2) working fluid flow from an exhaust gas flow within a first recuperator, wherein a bottoming cycle system includes the supercritical CO2 (sCO2) working fluid flow circulating through a bottoming compressor coupled to a bottoming turbine;
   communicating a heated sCO2 working fluid flow to a location forward of a combustor section of the gas turbine engine; and
   transferring thermal energy from the sCO2 working fluid flow to a compressed core flow at the location forward of the combustor section;
   wherein the gas turbine engine comprises a core engine including a core flow path connecting a compressor section, the combustor section and a turbine section, wherein the compressor section generates the compressed core flow from an inlet airflow that is mixed with fuel in the combustor and ignited to generate the exhaust gas flow.

8. The method as recited in claim 7, further comprising driving a bottoming turbine by expanding the heated sCO2 working fluid through the bottoming turbine.

9. The method as recited in claim 8, further comprising generating electric power by driving a generator with the bottoming turbine.

10. The method as recited in claim 7, wherein transferring thermal energy into a fluid flow at the location forward of the combustor comprise transferring thermal energy into one of a fuel flow or a core air flow.

11. The method as recited in claim 7, further comprising pumping the sCO2 working fluid flow with a bottoming compressor driven by the bottoming turbine.

* * * * *